United States Patent
Amemiya

(10) Patent No.: US 9,091,749 B2
(45) Date of Patent: Jul. 28, 2015

(54) RECEPTION CIRCUIT, ULTRASOUND PROBE AND ULTRASOUND IMAGE DISPLAY APPARATUS

(71) Applicant: GE MEDICAL SYSTEMS GOLBAL TECHNOLOGY COMPANY, LLC, Waukesha, WI (US)

(72) Inventor: Shinichi Amemiya, Tokyo (JP)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 517 days.

(21) Appl. No.: 13/660,776

(22) Filed: Oct. 25, 2012

(65) Prior Publication Data

US 2013/0107671 A1    May 2, 2013

(30) Foreign Application Priority Data

Oct. 26, 2011  (JP) .................................. 2011-235082
Jan. 27, 2012  (JP) .................................. 2012-015135

(51) Int. Cl.
*H04B 1/16* (2006.01)
*G01S 7/52* (2006.01)
*G10K 11/34* (2006.01)

(52) U.S. Cl.
CPC ........... *G01S 7/52026* (2013.01); *G01S 7/5208* (2013.01); *G01S 7/52096* (2013.01); *G10K 11/346* (2013.01)

(58) Field of Classification Search
CPC ............. G01S 7/52026; G01S 7/5208; G01S 7/52096; G10K 11/346
See application file for complete search history.

(56) References Cited

U.S. PATENT DOCUMENTS

| | | | |
|---|---|---|---|
| 4,387,597 A * | 6/1983 | Brandestini | 73/626 |
| 4,744,367 A * | 5/1988 | Kodama et al. | 600/437 |
| 4,787,392 A | 11/1988 | Saugeon | |
| 5,669,384 A | 9/1997 | Park et al. | |
| 6,500,120 B1 * | 12/2002 | Anthony | 600/437 |
| 6,705,995 B1 * | 3/2004 | Poland et al. | 600/447 |
| 6,918,876 B1 | 7/2005 | Kamiyama | |
| 7,351,204 B2 * | 4/2008 | Amemiya | 600/437 |
| 7,658,110 B2 * | 2/2010 | Fukukita | 600/447 |
| 7,713,208 B2 | 5/2010 | Kamiyama | |
| 8,934,272 B2 * | 1/2015 | Amemiya | 363/59 |
| 2002/0045820 A1* | 4/2002 | Pesque | 600/443 |

(Continued)

FOREIGN PATENT DOCUMENTS

| | | |
|---|---|---|
| CN | 103076603 A * | 5/2013 |
| JP | 2010068957 | 4/2010 |

*Primary Examiner* — Daniel Pihulic
(74) *Attorney, Agent, or Firm* — Armstrong Teasdale LLP

(57) ABSTRACT

A reception circuit disposed within an ultrasound probe is provided. The reception circuit includes, at least one amplifying unit configured to amplify echo signals received by ultrasound transducers, and at least one delay unit connected to the amplifying unit and including a first circuit and a second circuit each configured to apply a delay time to an output from the amplifying unit, wherein the first and second circuits each have a plurality of capacitor banks. Each capacitor bank includes two or more capacitors each configured to write therein a signal amplified by the amplifying unit, wherein the two or more capacitors are different from one another in capacitance, write switches configured to write an output current into the first and second capacitors of the two or more capacitors, and read switches configured to read the output written into the first and second capacitors.

20 Claims, 18 Drawing Sheets

(56) References Cited

U.S. PATENT DOCUMENTS

| | | |
|---|---|---|
| 2003/0188582 A1 | 10/2003 | Amemiya |
| 2005/0148874 A1* | 7/2005 | Brock-Fisher et al. ........ 600/447 |
| 2007/0225604 A1* | 9/2007 | Fukukita ........................ 600/437 |
| 2007/0232917 A1 | 10/2007 | Bae et al. |
| 2009/0016163 A1* | 1/2009 | Freeman et al. ............... 367/103 |
| 2009/0093720 A1* | 4/2009 | Petersen et al. ............... 600/447 |
| 2009/0171213 A1* | 7/2009 | Savord .......................... 600/447 |
| 2009/0292203 A1 | 11/2009 | Amemiya |
| 2010/0036251 A1* | 2/2010 | Baba ............................. 600/447 |
| 2012/0197130 A1* | 8/2012 | Amemiya et al. ............. 600/459 |
| 2012/0200196 A1* | 8/2012 | Amemiya ...................... 310/317 |
| 2012/0294113 A1* | 11/2012 | Amemiya .......................... 367/7 |
| 2013/0107671 A1* | 5/2013 | Amemiya ...................... 367/135 |
| 2013/0194894 A1* | 8/2013 | Amemiya ...................... 367/137 |

* cited by examiner

FIG. 5

| | A GROUP (142) | | | | B GROUP (144) | | | |
|---|---|---|---|---|---|---|---|---|
| | CA1 | CA2 | CA3 | CA4 | CB1 | CB2 | CB3 | CB4 |
| T0(0) | W | C |   | R | W | C | R |   |
| T1(CY/4) | R | W | C |   |   | W | C | R |
| T2(2CY/4) |   | R | W | C | R |   | W | C |
| T3(3CY/4) | C |   | R | W | C | R |   | W |
| T4(4CY/4) | W | C |   | R | W | C | R |   |

T1(CY/4)
A GROUP (142)

FIG. 10
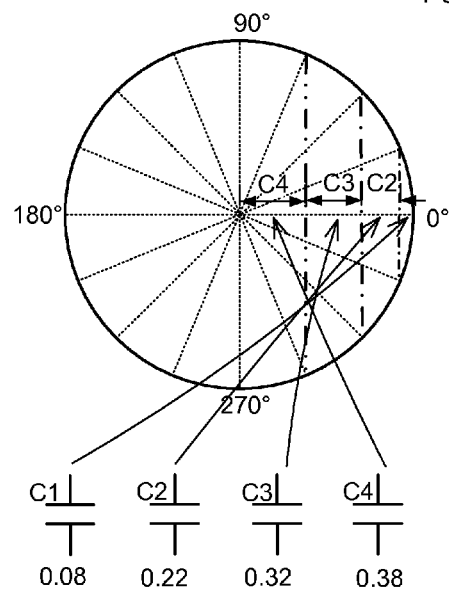
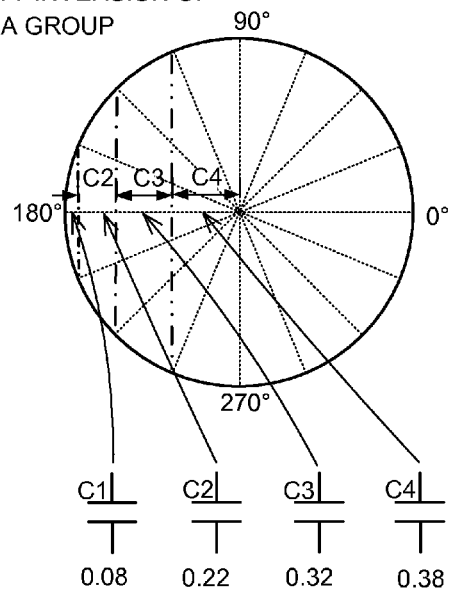
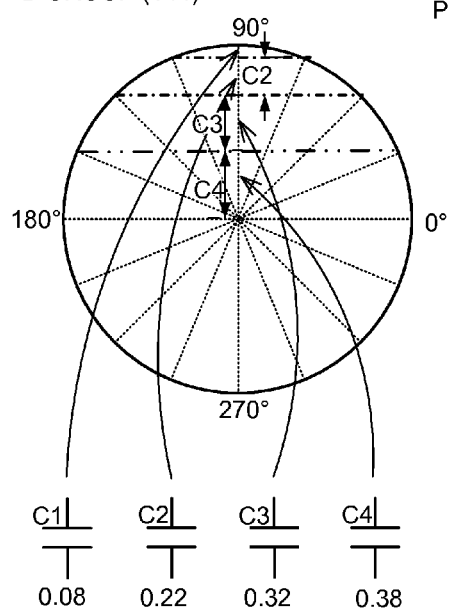
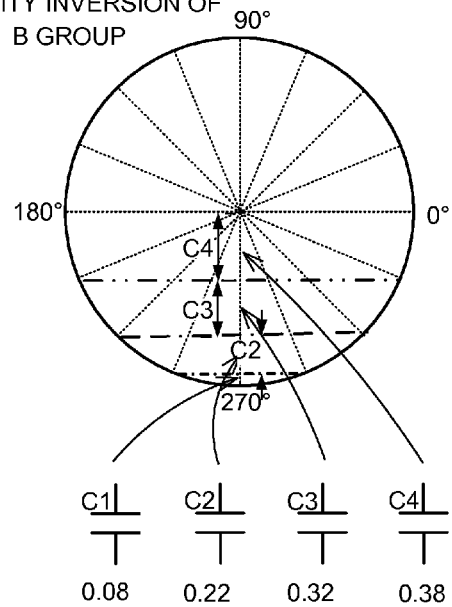

FIG. 11

| PHASE SHIFT | A GROUP (142: CA1~CA4) | | | | | B GROUP (144: CB1~CB4) | | | | |
|---|---|---|---|---|---|---|---|---|---|---|
| | CONNECTION | G1 | G2 | C3 | C4 | CONNECTION | G1 | G2 | C3 | C4 |
| 0 | POSITIVE | ON | ON | ON | ON | | | | | |
| 22.5 | POSITIVE | | ON | ON | ON | POSITIVE | | | | ON |
| 45 | POSITIVE | | | ON | ON | POSITIVE | | | ON | ON |
| 67.5 | POSITIVE | | | | ON | POSITIVE | | ON | ON | ON |
| 90 | | | | | | POSITIVE | | ON | ON | ON |
| 112.5 | NEGATIVE | | ON | | | POSITIVE | ON | ON | ON | ON |
| 135 | NEGATIVE | | ON | ON | | POSITIVE | | ON | ON | |
| 157.5 | NEGATIVE | | ON | ON | ON | POSITIVE | | | ON | |
| 180 | NEGATIVE | ON | ON | ON | ON | | | | | |
| 202.5 | NEGATIVE | | ON | ON | ON | NEGATIVE | | | | ON |
| 225 | NEGATIVE | | | ON | ON | NEGATIVE | | | ON | ON |
| 247.5 | NEGATIVE | | | | ON | NEGATIVE | | ON | ON | ON |
| 270 | | | | | | NEGATIVE | ON | ON | ON | ON |
| 292.5 | POSITIVE | | ON | | | NEGATIVE | ON | ON | ON | ON |
| 315 | POSITIVE | | ON | ON | | NEGATIVE | | ON | ON | ON |
| 337.5 | POSITIVE | | ON | ON | ON | NEGATIVE | | | ON | ON |
| 360 | POSITIVE | ON | ON | ON | ON | | | | | |

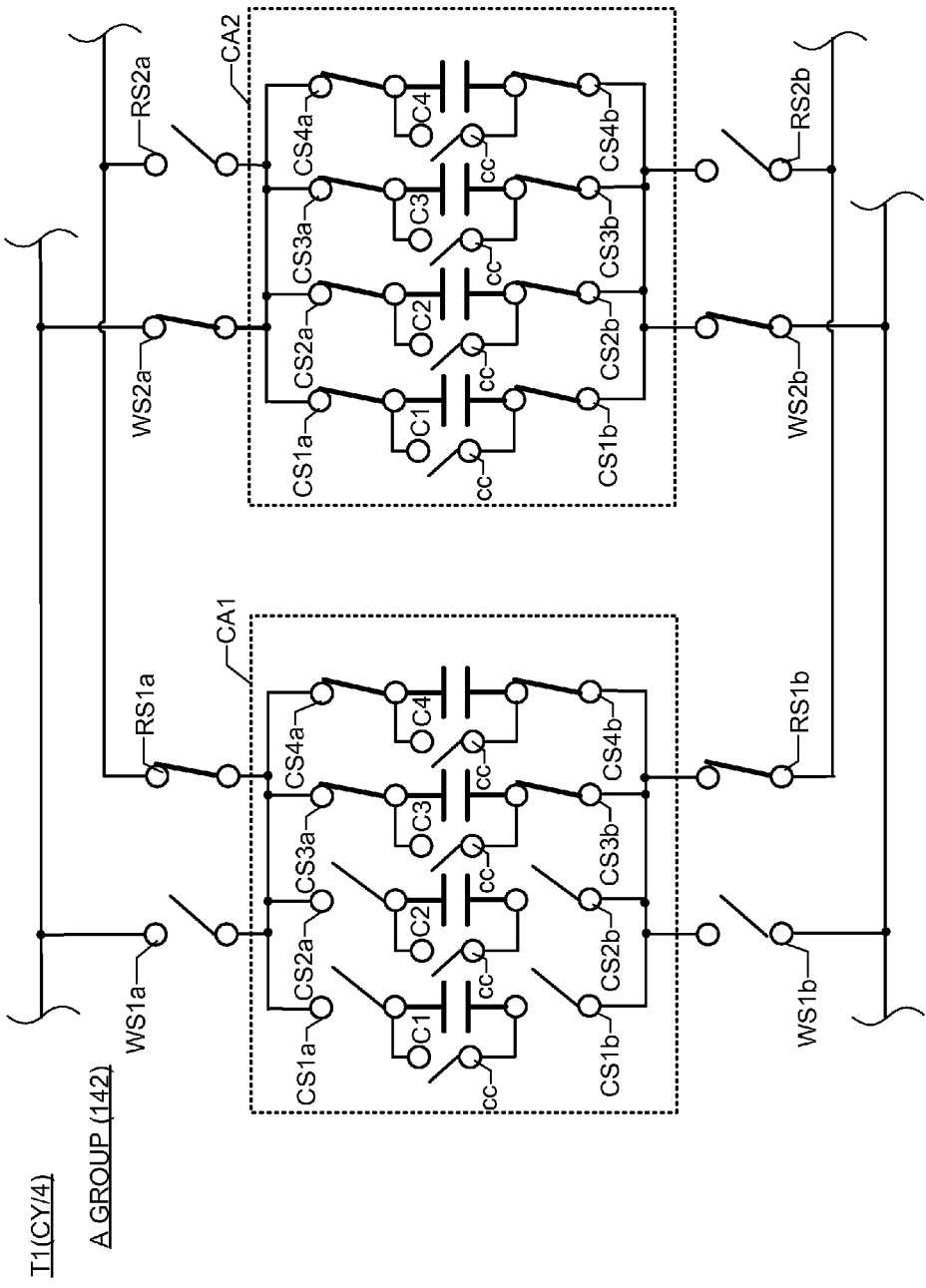

FIG. 15

|  | A GROUP (142) ||||||||| B GROUP (144) |||||||||
|  | CA1 | CA2 | CA3 | CA4 | CA5 | CA6 | CA7 | CA8 | CB1 | CB2 | CB3 | CB4 | CB5 | CB6 | CB7 | CB8 |
|---|---|---|---|---|---|---|---|---|---|---|---|---|---|---|---|---|
| T0(0) | W | C |  |  |  |  |  |  |  |  |  |  |  |  |  |  |
| T1(CY/8) | R | W | C |  |  |  |  |  |  |  |  |  |  |  | R |  |
| T2(2CY/8) |  | R | W | C |  |  |  |  | R |  |  |  |  |  |  |  |
| T3(3CY/8) |  |  | R | W | C |  |  |  |  | R |  |  |  |  |  |  |
| T4(4CY/8) |  |  |  | R | W | C |  |  |  |  | R |  |  |  |  |  |
| T5(5CY/8) |  |  |  |  | R | W | C |  |  |  |  | R |  |  |  |  |
| T6(6CY/8) | C |  |  |  |  | R | W | C |  |  |  |  | R |  |  |  |
| T7(7CY/8) |  |  |  |  |  |  | R | W | C |  |  |  |  | R |  |  |
| T8(8CY/8) | W | C |  |  |  |  |  | R | W | C |  |  |  |  | C | C |

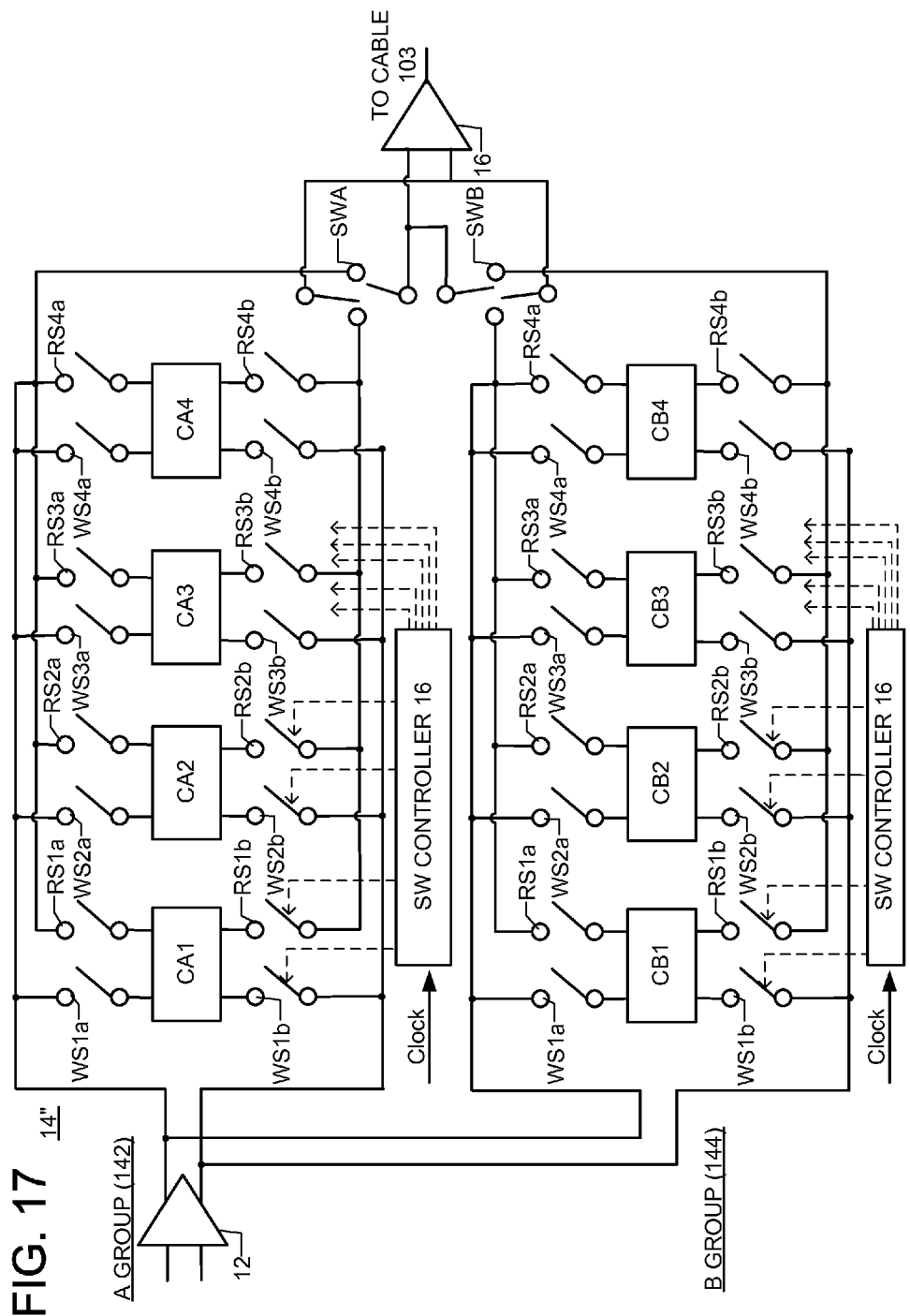

A reception circuit as disclosed herein is capable of suppressing power consumption by using capacitors. The reception circuit is capable of setting a predetermined delay time to an output signal by using two or more capacitors different in capacity.

RECEPTION CIRCUIT, ULTRASOUND PROBE AND ULTRASOUND IMAGE DISPLAY APPARATUS

CROSS REFERENCE TO RELATED APPLICATIONS

This application claims the benefit of Japanese Patent Application No. 2011-235082 filed Oct. 26, 2011 and Japanese Patent Application No. 2012-015135 filed Jan. 27, 2012, both of which are hereby incorporated by reference in their entirety.

BACKGROUND OF THE INVENTION

The present invention relates to a reception circuit having delay units each of which applies a predetermined delay time to an output signal obtained by amplifying each echo signal of ultrasound, an ultrasound probe equipped with the reception circuit, and an ultrasound image display apparatus.

In an ultrasound image display apparatus, ultrasound is transmitted through a plurality of ultrasound transducers provided in an ultrasound probe, and the ultrasound transducers receive echo signals therein. The echo signals received by the ultrasound transducers are inputted to a reception circuit, where they are phased and added together. Consequently, a single reception beam is formed.

In this reception circuit, the echo signals are amplified by amplifying units provided for every ultrasound transducer. As shown in, for example, Japanese Unexamined Patent Publication No. 2010-68957, output signals of the individual amplifying units are respectively delayed by a predetermined time at delay units, followed by being added together at an addition unit.

In general, a delay unit makes use of an RC circuit including a resistor and a capacitor. A number of amplifying units should however be used for the RC circuit. A resistor low in resistance value is used to reduce resistance noise. Therefore, the delay unit using the RC circuit increases in the amount of consumption of energy.

BRIEF DESCRIPTION OF THE INVENTION

In a first aspect, a reception circuit is provided. The reception circuit is equipped with at least one amplifying unit which amplifies a current of each of echo signals received by ultrasound transducers, and at least one delay unit which is connected to the amplifying unit and has a first circuit and a second circuit each applying a delay time to an output current. The first and second circuits have 4n (where n: natural number) capacitor banks respectively. The capacitor banks respectively include two or more capacitors which write therein the output current amplified by the amplifying unit and are different in capacitance, write switches which write an output current into the first and second capacitors of the two or more capacitors, and read switches which read the output current written into the first and second capacitors.

In a second aspect, a timing provided to read the output current from each of the capacitors of the first circuit, and a timing provided to read the output current from each of the capacitors of the second circuit are made different in phase from each other by 90° by the read switches.

In a third aspect, a timing provided to read the output current from each of the capacitors of the first circuit, and a timing provided to read the output current from each of the capacitors of the second circuit are identical to each other, and the second circuit has a 90° phase shifter.

In a fourth aspect, the 4n capacitor banks of the first circuit and the 4n capacitor banks of the second circuit are identical in write timing every capacitor bank by the write switches.

In a fifth aspect, the output current is written into all the capacitors of the first and second circuits by the write switches, and the output current is read from a predetermined capacitor of the capacitors according to the delay time by the read switches.

In a sixth aspect, the output current is written into predetermined capacitors of the first and second circuits by the write switches, and the output current is read from the predetermined capacitors according to the delay time by the read switches.

In a seventh aspect, the 4n capacitor banks of the first circuit are respectively made different in phase by (90°/n) and the output current is written therein by the write switches.

In a seventh aspect, capacitance ratios for the two or more capacitors are set in such a manner that the delay time is evenly divided.

In a ninth aspect, a delay unit lying within the reception circuit is provided for each of the channels of the ultrasound transducers.

In a tenth aspect, the total capacitance of the capacitors in the reception circuit is smaller than the capacitance of a cable which connects the ultrasound probe and an apparatus main body of an ultrasound image display apparatus.

In a eleventh aspect, the output current of each delay unit is added at an output line extended from the delay unit on the subsequent stage side of the read switches.

In a twelfth aspect, an amplifying unit of the reception circuit is either a V/I amplifying unit which amplifies an input signal corresponding to a voltage signal and which converts the same into a current signal and outputs the same therefrom, or an I/I amplifying unit which amplifies an input signal corresponding to a current signal and outputs the current signal therefrom.

In a thirteenth aspect, the reception circuit is further equipped with a switch controller which varies a switching clock frequency of each of the read and write switches.

In a fourteenth aspect, in the twelfth aspect, the switching clock frequency becomes low as an echo reflection point of a subject becomes deeper.

The reception circuit according to each of the first through fourteenth aspects may be provided with an ultrasound probe. The ultrasound probe is used in an ultrasound image display apparatus.

Advantages of the embodiments described herein will be apparent from the following description of the exemplary embodiments as illustrated in the accompanying drawings.

BRIEF DESCRIPTION OF THE DRAWINGS

FIG. 5 is a diagram for describing timings provided to write into and read from capacitors lying within four capacitor banks CA and four capacitor banks CB, and clear their electric charges.

FIG. 10 is a diagram illustrating the relationship between the capacitances of four capacitors C and one cycle CY.

FIG. 11 is a table showing a state of on/off switches CS relative to capacitors C1 through C4 when an output current is phase-shifted every 22.5°.

FIG. 12 is a diagram depicting a state of the on/off switches CS of the capacitor banks CA1 and CA2 at the time T1.

FIG. 15 is a diagram for describing timings provided to write into and read from capacitors lying within eight capacitor banks CA and eight capacitor banks CB, and clear their electric charges.

FIG. 17 is a diagram illustrating a configuration of a delay unit within a reception circuit according to a sixth embodiment.

DETAILED DESCRIPTION OF THE INVENTION

First Embodiment

Configuration of Ultrasound Image Display Apparatus

Figure 1:
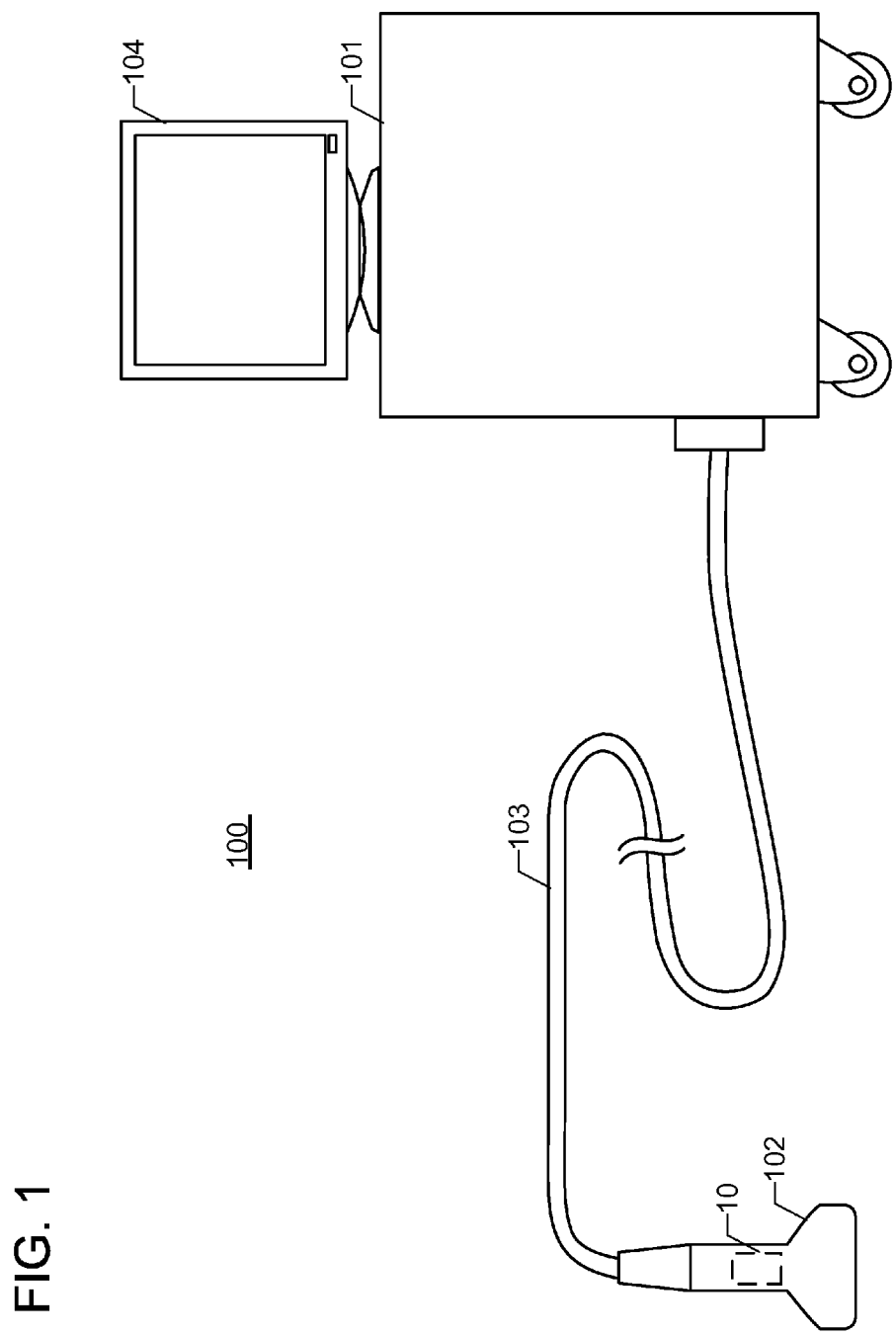
FIG. 1 is a schematic diagram showing one example of an embodiment of an ultrasound image display apparatus.

FIG. 1 is a schematic diagram showing one example of an ultrasound image display apparatus 100 according to a first embodiment. As shown in FIG. 1, the ultrasound image display apparatus 100 has an apparatus main body 101 and an ultrasound probe 102 connected to the apparatus main body 101. The ultrasound probe 102 is connected to the apparatus main body 101 through a cable 103.

The ultrasound probe 102 is provided with a reception circuit 10 inputted with echo signals of ultrasound received by ultrasound transducers. Although not shown in the drawing in particular, the ultrasound probe 102 may be provided with a transmission circuit which drives each ultrasound transducer of the ultrasound probe 102 on a predetermined transmission condition and causes it to scan a scan plane in a sound ray order by means of an ultrasound beam.

A signal outputted from the reception circuit 10 is inputted to the apparatus main body 101 through the cable 103. The output signal is A/D-converted at an A/D conversion unit unillustrated in the apparatus main body 101. Then, the ultrasound image display apparatus 100 generates an ultrasound image, based on a post-A/D conversion echo signal and displays the ultrasound image on a display unit 104 of the apparatus main body 101.

<Configuration of Reception Circuit>

Figure 2:
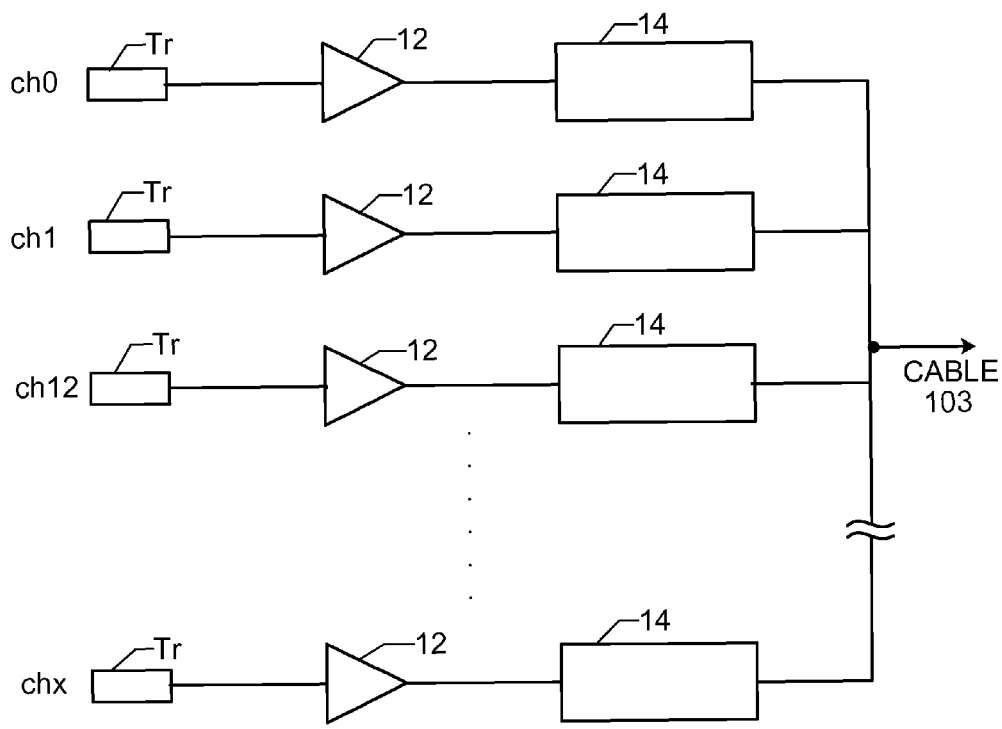
FIG. 2 is a block diagram illustrating a reception circuit.

FIG. 2 is a block diagram showing the reception circuit 10. The reception circuit 10 has amplifiers 12 and delay units 14. The amplifiers 12 and the delay units 14 are provided for each of a plurality ultrasound transducers Tr that are provided for channel 0 (ch0) through channel x (chx) where x is an arbitrary natural number. Echo signals received by the respective ultrasound transducers Tr are respectively amplified by the amplifiers 12, followed by being given predetermined delay times by the delay units 14 respectively. The ultrasound transducers Tr placed in the ultrasound probe 102 may be arranged in a one-dimensional array or a two-dimensional array. The ultrasound transducers Tr may electronically be controlled individually or in group units.

Each of the amplifiers 12 includes a current output circuit. The current output circuit is either a V/I amplifying unit that amplifies an input signal corresponding to a voltage signal and that converts it into a current signal and outputs the same therefrom, or an I/I amplifying unit that amplifies an input signal corresponding to a current signal and outputs the current signal.

<Configuration of Delay Unit>

Figure 3:
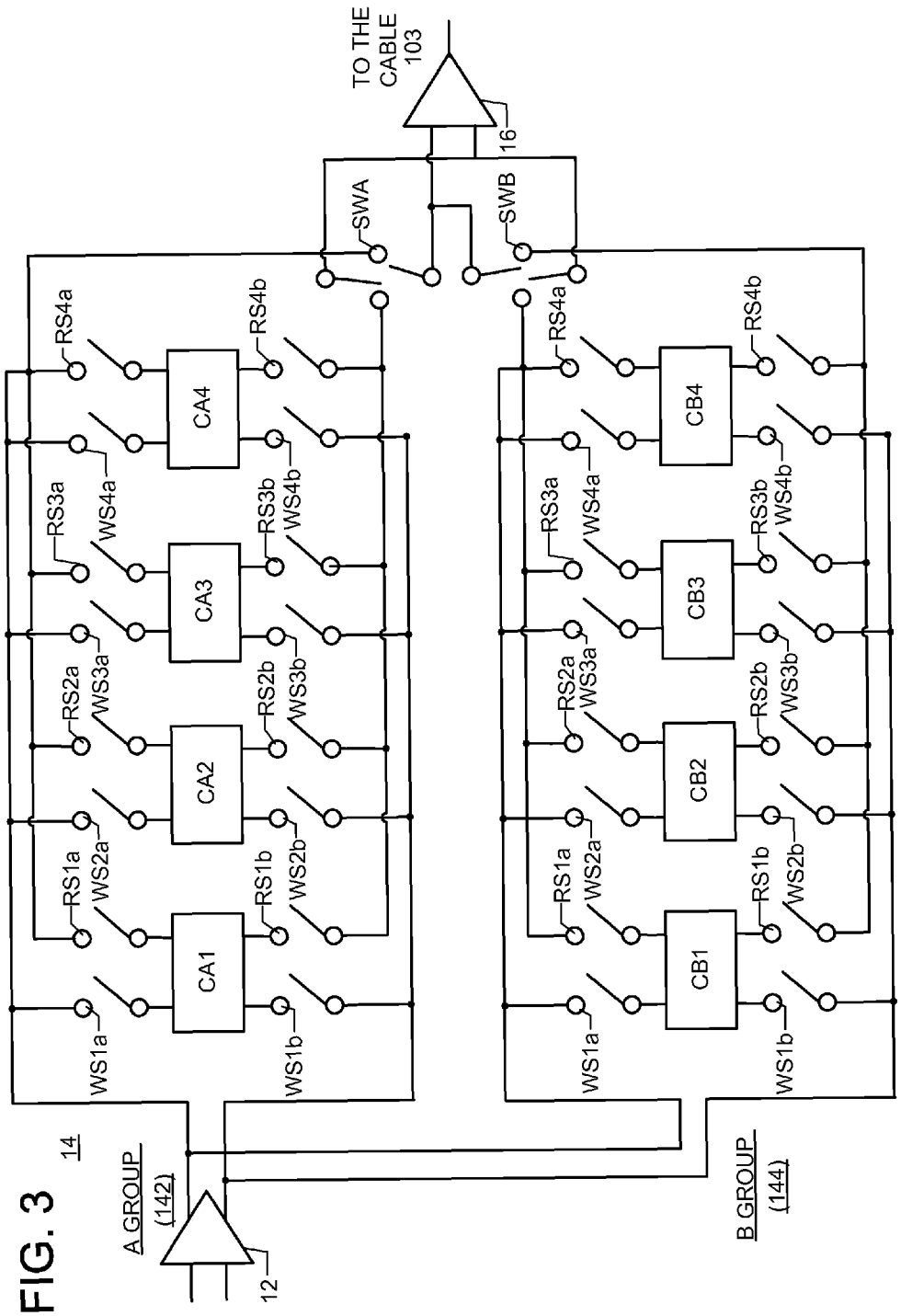
FIG. 3 is a diagram depicting a configuration of a delay unit lying within the reception circuit according to a first embodiment.

FIG. 3 is a diagram showing a configuration of a delay unit 14 in the reception circuit 10. As shown in FIG. 3, the delay unit 14 is roughly divided into an A group circuit 142 and a B group circuit 144. The A group circuit 142 has capacitor banks CA (CA1 through CA4), write switches WS (WS1*a* through WS4*a* and WS1*b* through WS4*b*), and read switches RS (RS1*a* through RS4*a* and RS1*b* through RS4*b*). The B group circuit 144 has capacitor banks CB (CB1 through CB4), write switches WS (WS1*a* through WS4*a* and WS1*b* through WS4*b*), and read switches RS (RS1*a* through RS4*a* and RS1*b* through RS4*b*). In the first embodiment, the A group circuit 142 has the capacitor banks CA1 through CA4, and the B group circuit 144 has the capacitor banks CB1 through CB4. They are however not limited to the present embodiment. The A group circuit 142 and the B group circuit 144 may have capacitors of 4n (where n is a natural number) respectively. The A group circuit 142 and the B group circuit 144 are substantially identical in configuration. The capacitor banks will be described later using FIG. 4.

The write switches WS1*a* and WS1*b* are connected to the capacitor bank CA1 of the A group circuit 142. Further, the read switches RS1*a* and RS1*b* are connected to the capacitor bank CA1. Similarly, the write switches WS2*a* and WS2*b* are connected to the capacitor bank CA2. Further, the read switches RS2*a* and RS2*b* are connected to the capacitor bank CA2. As shown in FIG. 3, the capacitor banks CA3 and CA4 are configured similarly.

The write switches WS1*a* and WS1*b* are connected to the capacitor bank CB1 of the B group circuit 144. Further, the read switches RS1*a* and RS1*b* are connected to the capacitor bank CB1 thereof. Similarly, the write switches WS2*a* and WS2*b* are connected to the capacitor bank CB2. Further, the read switches RS2*a* and RS2*b* are connected to the capacitor bank CB2. The capacitor banks CB3 and CB4 are configured similarly.

One end side of each of the write switches WS of the A group circuit 142 and the B group circuit 144 is connected to the amplifier 12, whereas the other end side thereof is connected to one end side of the capacitor banks CA or CB. One end side of each of the read switches RS of the A group circuit 142 is connected to one end side of the capacitor banks CA, whereas the other end side thereof is connected to a changeover switch SWA. Similarly, one end side of each of the read switches RS of the B group circuit 144 is respectively connected to one end side of the capacitor banks CB, whereas the other end side thereof is respectively connected to a changeover switch SWB.

The output side of the changeover switch SWA and the output side of the changeover switch SWB are connected to a differential amplifying unit 16. The delay unit 14 performs current sampling by means of such a circuit configuration. Incidentally, although the write switches WS1*a* through WS4*a* and WS1*b* through WS4*b* are provided in FIG. 4, they may directly be connected without the write switches WS1*b* through WS4*b*. Similarly, either the read switches RS1*a* through RS4*a* or RS1*b* through RS4*b* may not be provided.

The differential amplifying unit 16 can use a differential voltage amplifier, a differential IN converter or a differential I/I converter. When the voltage is detected at the cable, the connected capacitors C are required to be equal in total capacitance. Therefore, supplementary capacitors that make equal the respective total capacitances are prepared for the differential amplifying unit 16. That is, the differential amplifying unit 16 is connected to stored charge-free supplementary capacitors to make equal the total capacitances according to the connected capacitances of the capacitors C1 through C4 of both the capacitor banks CA and CB.

In such a manner that the current is output as it is without the provision of the differential amplifying unit 16, one end of the output sides of the changeover switch SWA and the changeover switch SWB may perform output, and the other end of the output sides of the changeover switch SWA and the changeover switch SWB may be connected to ground. In the exemplary embodiment, when the current is outputted to the cable 103 as it is without the provision of the differential amplifying unit 16, the total capacitance of the capacitors C is made smaller than the capacitance of the cable 103 in such a manner that the current written in each capacitor C flows through the cable 103. Thus, in the exemplary embodiment, a cable having a capacitance larger than the total capacitance of the capacitors C is selected as the cable 103. The capacitance of each capacitor varies depending on the phase. Eight phases are taken at the minimum and maximum. Alternatively, the capacitance thereof reaches 1.4 times (0.32×2+0.38×2) in the case of 16 phases. If the capacitance of the cable reaches 20 times, it has an amplitude error of 3% or so, but there is almost no real damage.

<Configuration of Capacitor Bank>

Figure 4:
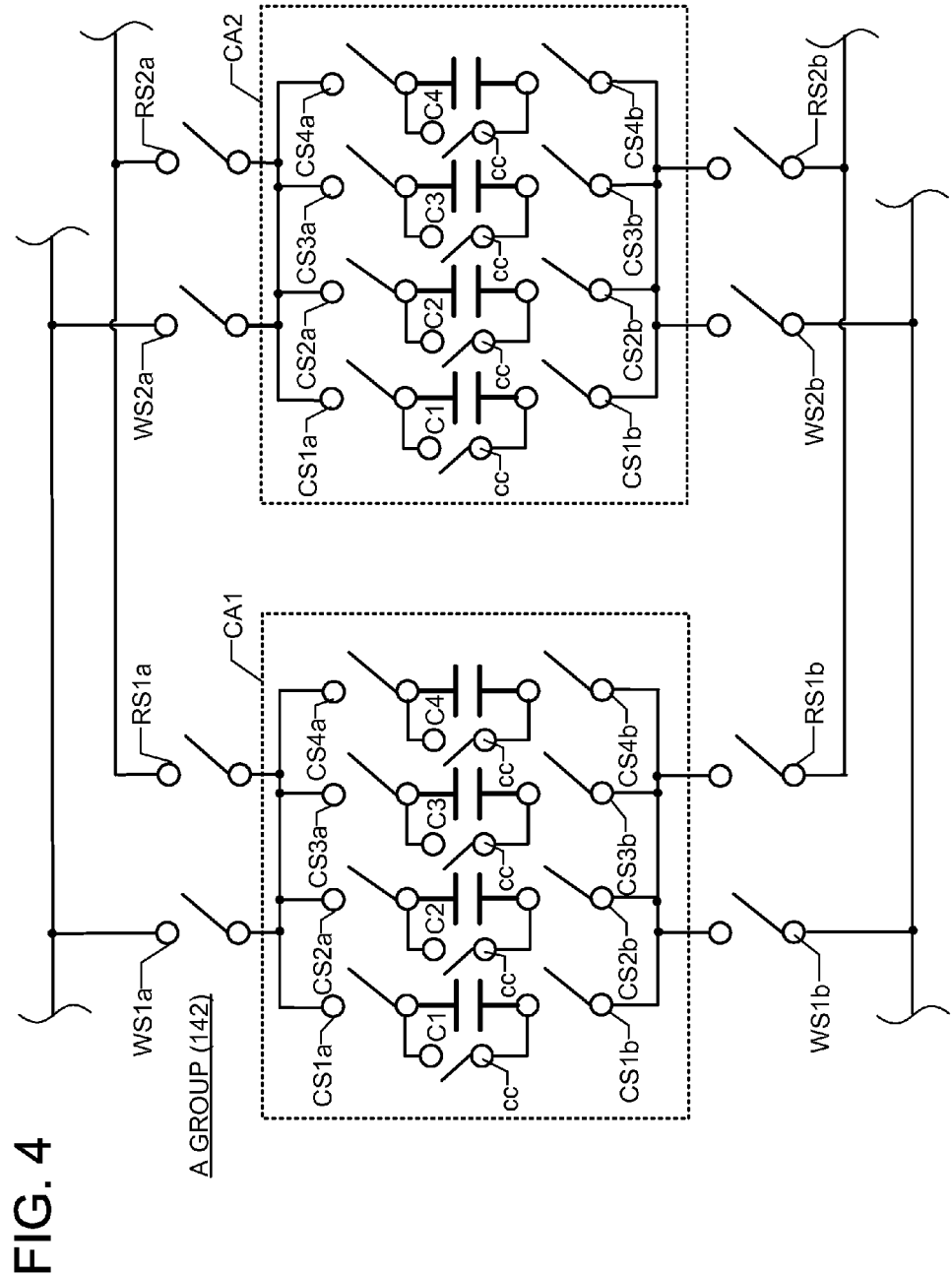
FIG. 4 is a diagram showing a configuration of capacitor banks CA of the delay unit.

FIG. 4 is a diagram showing a configuration of the capacitor banks CA1 and CA2 of the A group circuit 142 of the delay unit 14. Although not shown in the drawing, the capacitor banks CA3 and CA4 are also similar in configuration. Further, the capacitor banks CB1 through CB4 of the B group circuit 144 are also similar in configuration. Therefore, the configuration of the capacitor bank CA1 will be described, and the description of other capacitor banks will be omitted.

The capacitor bank CA1 has capacitors C1 through C4, on/off switches CS (CS1*a* through CS4*a* and CS1*b* through CS4*b*) for performing switching between on and off of current, and clear switches cc. In the first embodiment, the capacitor bank CA1 has the four capacitors C, but is not limited to the number thereof. The capacitor bank CA1 may include two or more capacitors C.

The capacitor C1 has on/off switches CS1*a* and CS1*b* at both ends. Similarly, the capacitor C2 has on/off switches CS2*a* and CS2*b* at both ends. The capacitors C3 and C4 are also configured similarly. The respective on/off switches CS are connected to write switches WS1*a* and WS1*b* or read switches RS1*a* and RS1*b* respectively. The clear switches cc are connected in parallel with the respective capacitors C. When each clear switch cc is connected, the electric charge (output current) written in each capacitor C is cleared (discharged). Incidentally, the on/off switches CS1*a* through CS4*a* and CS1*b* through CS4*b* are provided in FIG. 4, but either the on/off switches CS1*a* through CS4*a* or CS1*b* through CS4*b* may not be provided.

<Operation of Delay Unit>

Figure 6:
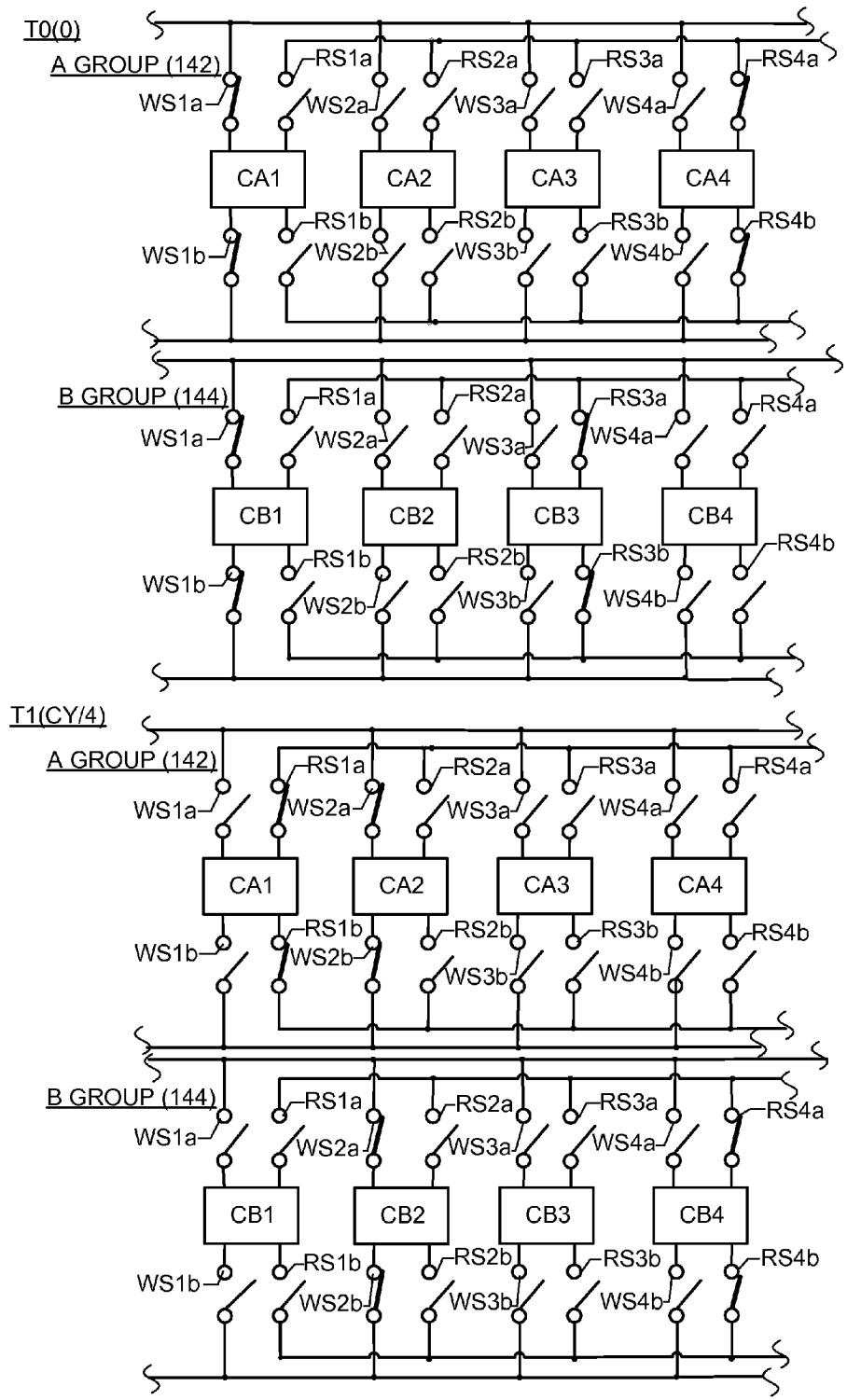
FIG. 6 is a diagram showing a state of write switches WS and read switches RS at times T0 and T1.
Figure 7:
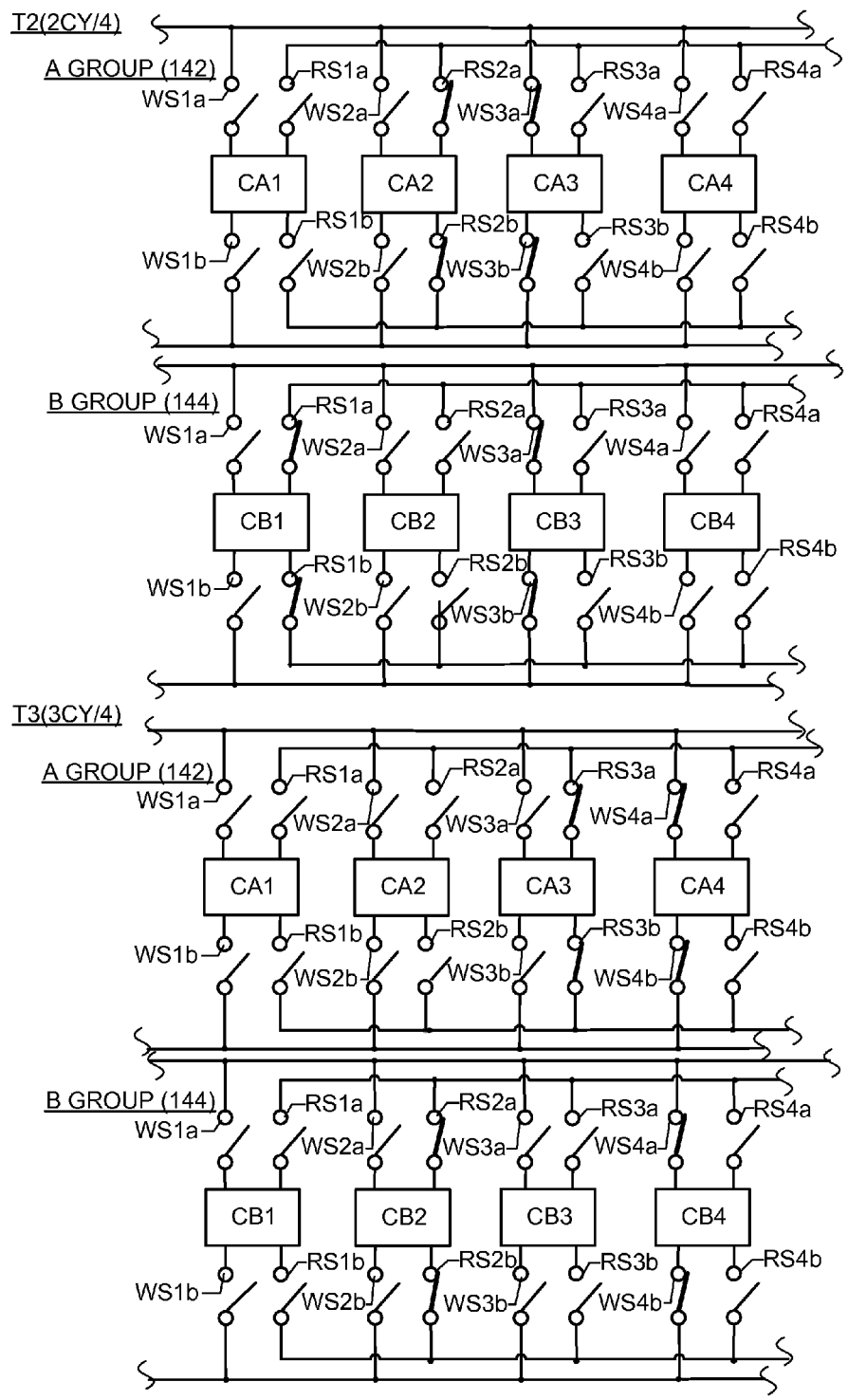
FIG. 7 is a diagram illustrating a state of the write switches WS and the read switches RS at times T2 and T3.
Figure 8:
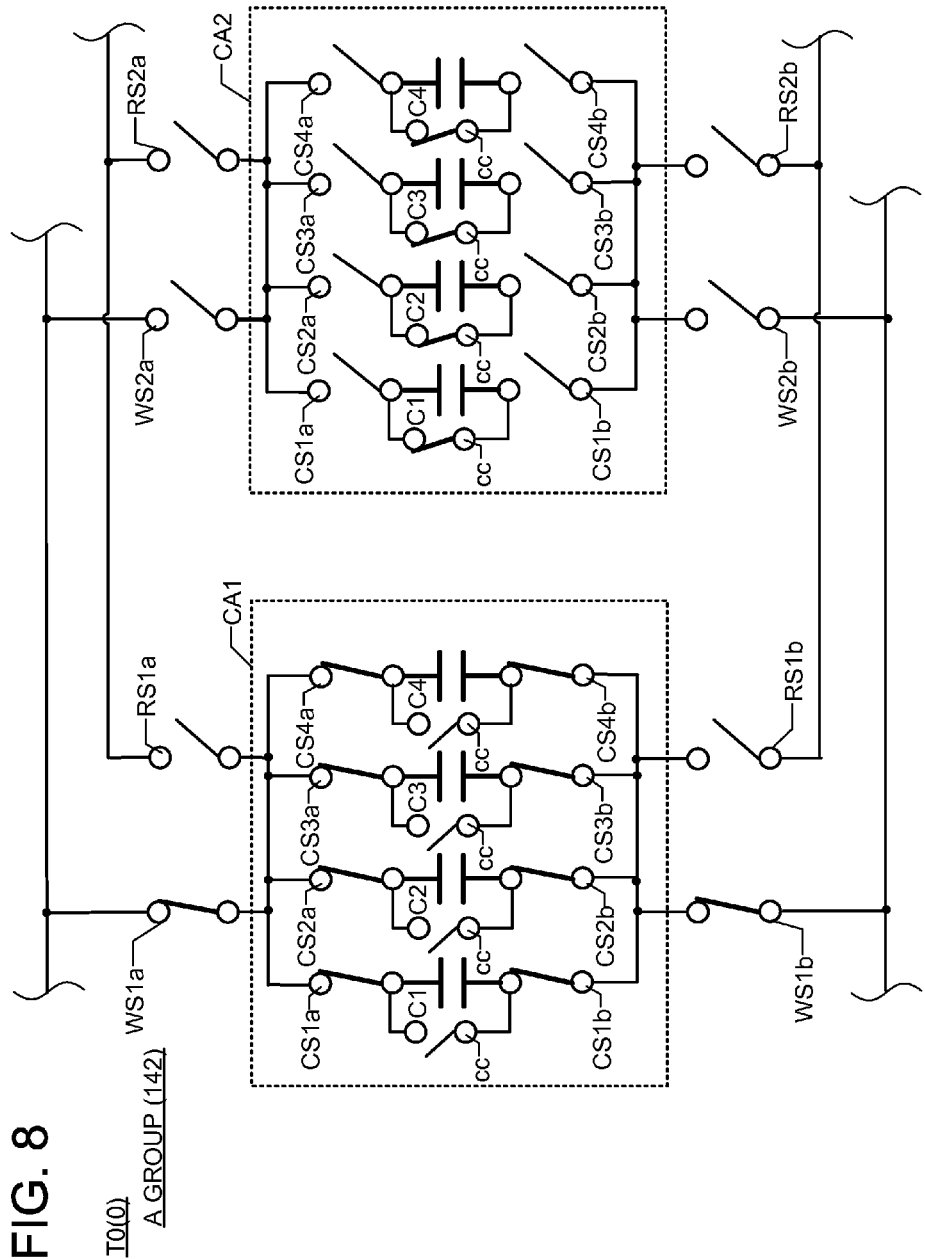
FIG. 8 is a diagram depicting a state of on/off switches of capacitor banks CA1 and CA2 at the time T0.
Figure 9:
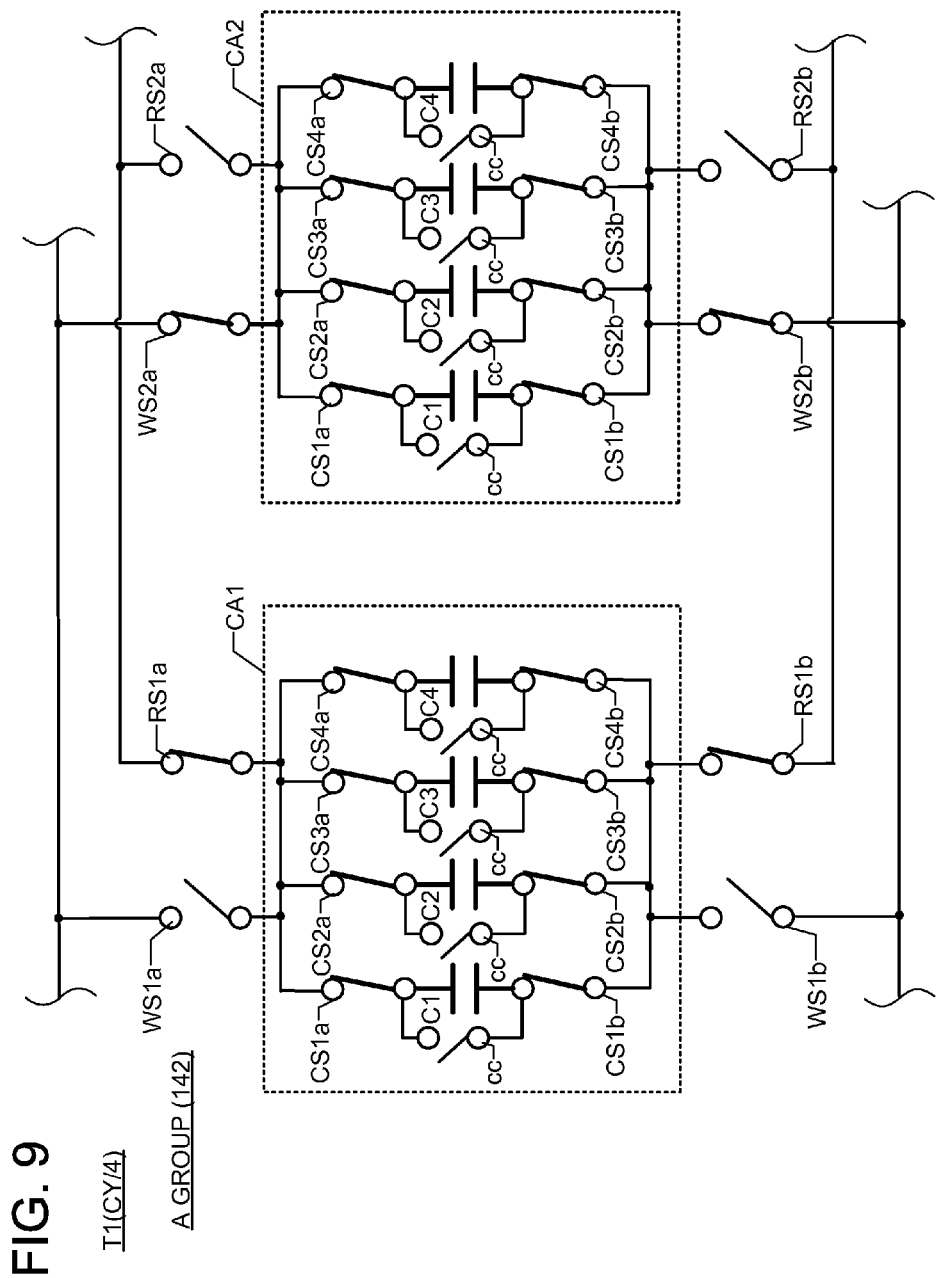
FIG. 9 is a diagram showing a state of the on/off switches of the capacitor banks CA1 and CA2 at the time T1.

The operation of the delay unit 14 will next be explained. FIG. 5 is a diagram for describing timings provided to write an output current into and read the same from capacitors lying within capacitor banks CA (CA1 through CA4) and capacitor banks CB (CB1 through CB4) and clear each electric charge. FIG. 6 is a diagram showing a state of write switches WS and read switches RS at times T0 and T1. FIG. 7 is a diagram illustrating a state of the write switches WS and the read switches RS at times T2 and T3. Further, FIG. 8 is a diagram depicting a switching state of the capacitor banks CA1 and CA2 at the time T0. FIG. 9 is a diagram showing a switching state of the capacitor banks CA1 and CA2 at the time T1.

In FIG. 5, the write is expressed as "W", the read is expressed as "R", and the clear of electric charge is expressed as "C", respectively. In FIG. 5, one cycle CY is set between the times T0 (0) and T4 (4CY/4) and shown divided into four equal parts. The timings provided to write the output current, read the same and clear the electric charge are the same at the times T0 (0) and T4 (4CY/4). The writing of the output current, the reading thereof and the clearing of the electric charge are subsequently continued at times T5 (5CY/4), T6 (6CY/4) etc.

<Time T0 (0)>

At the time T0 (0) shown in FIG. 5, the capacitor bank CA1 of the A group circuit 142 is represented as write (W), the capacitor bank CA2 thereof is represented as charge's clear (C), and the capacitor bank CA4 is represented as read (R), respectively. The capacitor bank CB1 of the B group circuit 144 is represented as write (W), the capacitor bank CB2 thereof is represented as charge's clear (C), and the capacitor bank CB3 thereof is represented as read (R), respectively.

The upper stage of FIG. 6 shows the state of the write switches WS and the read switches RS at the time T0 (0). The write switches WS1*a* and WS1*b* are connected to the capacitor bank CA1 of the A group circuit 142. Further, as shown in FIG. 8, the on/off switches CS1*a* (CS1*b*) through CS4*a* (CS4*b*) are respectively connected to the capacitors C1 through C4. Therefore, the output current amplified by the amplifier 12 (refer to FIG. 3) is written (stored) into the capacitors C1 through C4. The read switches RS1*a* and RS1*b* are connected to the capacitor bank CA4 of the A group circuit 142. Although not shown in the drawing, the on/off switches CS1*a* (CS1*b*) through CS4*a* (CS4*b*) are respectively connected to the capacitors C1 through C4 lying within the capacitor bank CA4. Therefore, the electric charge (output current) stored in each of the capacitors C1 through C4 is read into the differential amplifying unit 16 (refer to FIG. 3).

At the time T0 (0), the respective capacitors C of the capacitor bank CA2 are placed in a connected state of their corresponding clear switches cc, and hence the electric charges stored in the respective capacitors C are cleared.

At the upper stage of FIG. 6, the write switches WS1*a* and WS1*b* are connected to the capacitor bank CB1 of the B group circuit 144. At this time, an output current is written (stored) in each of the capacitors C1 through C4 lying within the capacitor bank CB1 of the B group circuit 144. The read switches RS3*a* and RS3*b* are connected to the capacitor bank CB3. At this time, the electric charge (output current) stored in each of the capacitors C1 through C4 lying within the capacitor bank CB3 is read into the differential amplifying unit 16.

<Time T1 (CY/4)>

At the time T1 (CY/4) shown in FIG. 5, the capacitor bank CA1 of the A group circuit 142 is represented as read (R), the capacitor bank CA2 thereof is represented as write (W), and the capacitor bank CA3 is represented as charge's clear (C), respectively. The capacitor bank CB2 of the B group circuit 144 is represented as write (W), the capacitor bank CB3 thereof is represented as charge's clear (C), and the capacitor bank CB4 is represented as read (R), respectively.

The lower stage of FIG. 6 shows a state of the write and read switches SW and RS at the time T1 (CY/4). The read switches RS1a and RS1b are connected to the capacitor bank CA1 of the A group circuit 142. Further, as shown in FIG. 9, the on/off switches CS1a (CS1b) through CS4a (CS4b) are respectively connected to the capacitors C1 through C4. Therefore, the electric charge stored in each of the capacitors C1 through C4 is read into the differential amplifying unit 16 (refer to FIG. 3). The write switches WS2a and WS2b are connected to the capacitor bank CA2 of the A group circuit 142. As shown in FIG. 9, the on/off switches CS1a (CS1b) through CS4a (CS4b) are respectively connected to the capacitors C1 through C4 lying within the capacitor bank CA2. Therefore, the output current amplified by the amplifier 12 (refer to FIG. 3) is written into each of the capacitors C1 through C4.

At the time T1 (CY/4), the respective capacitors C of the capacitor bank CA3 are placed in a connected state of their corresponding clear switches cc, so that the electric charges stored in the respective capacitors C are cleared.

At the lower stage of FIG. 6, the write switches WS2a and WS2b are connected to the capacitor bank CB2 of the B group circuit 144. At this time, an electric charge is written in each of the capacitors C1 through C4 lying within the capacitor bank CB2 of the B group circuit 144. The read switches RS4a and RS4b are connected to the capacitor bank CB4. At this time, the electric charge stored in each of the capacitors C1 through C4 lying within the capacitor bank CB4 is read into the differential amplifying unit 16.

<Time T2 (2CY/4)>

At the time T2 (2CY/4) shown in FIG. 5, the capacitor bank CA2 of the A group circuit 142 is represented as read (R), the capacitor bank CA3 thereof is represented as write (W), and the capacitor bank CA4 thereof is represented as charge's clear (C), respectively. The capacitor bank CB1 of the B group circuit 144 is represented as read (R), the capacitor bank CB3 thereof is represented as write (W), and the capacitor bank CB4 thereof is represented as charge's clear (C), respectively.

The upper stage of FIG. 7 indicates the state of the write switches WS and the read switches RS at the time T2 (2CY/4). The read switches RS2a and RS2b are connected to the capacitor bank CA2 of the A group circuit 142. Therefore, the electric charge stored in each of the capacitors C1 through C4 of the capacitor bank CA2 is read into the differential amplifying unit 16. The write switches WS3a and WS3b are connected to the capacitor bank CA3 of the A group circuit 142. An output current amplified by the amplifier 12 is written into the capacitors C1 through C4 of the capacitor bank CA3.

At the time T2 (2CY/4), the respective capacitors C of the capacitor bank CA4 are placed in a connected state of their corresponding clear switches cc. Thus, the electric charge stored in each capacitor C is cleared.

At the upper stage of FIG. 7, the read switches RS1a and RS1b are connected to the capacitor bank CB1 of the B group circuit 144. At this time, the electric charge stored in each of the capacitors C1 through C4 lying within the capacitor bank CB1 is read into the differential amplifying unit 16. The write switches WS3a and WS3b are connected to the capacitor bank CB3. At this time, an output current is written into the capacitors C1 through C4 lying within the capacitor bank CB3 of the B group circuit 144.

<Time T3 (3CY/4)>

At the time T3 (3CY/4) shown in FIG. 5, the capacitor bank CA1 of the A group circuit 142 is represented as charge's clear (C), the capacitor bank CA3 thereof is represented as read (R), and the capacitor bank CA4 is represented as write (W), respectively. The capacitor bank CB1 of the B group circuit 144 is represented as charge's clear (C), the capacitor bank CB3 thereof is represented as read (R), and the capacitor bank CB4 thereof is represented as write (W), respectively.

The lower stage of FIG. 7 indicates a state of the write switches WS and the read switches RS at the time T3 (3CY/4). The read switches RS3a and RS3b are connected to the capacitor bank CA3 of the A group circuit 142. Therefore, the electric charge stored in each of the capacitors C1 through C4 of the capacitor bank CA3 is read into the differential amplifying unit 16. The write switches WS4a and WS4b are connected to the capacitor bank CA4 of the A group circuit 142. An output current amplified by the amplifier 12 is written into the capacitors C1 through C4 of the capacitor bank CA4.

At the time T3 (3CY/4), the respective capacitors C of the capacitor bank CA1 are placed in a connected state of their corresponding clear switches cc. Thus, the electric charge stored in each capacitor C is cleared.

At the lower stage of FIG. 7, the read switches RS2a and RS2b are connected to the capacitor bank CB2 of the B group circuit 144. At this time, the electric charge stored in each of the capacitors C1 through C4 lying within the capacitor bank CB2 is read into the differential amplifying unit 16. The write switches WS4a and WS4b are connected to the capacitor bank CB4. At this time, an output current is written into the capacitors C1 through C4 lying within the capacitor bank CB4 of the B group circuit 144.

<Control of Delay Time (Phase-Shift)>

A description will next be made of a delay in output current. The delay is performed by phase-shifting (shifting the phase of an output current) the output current amplified by the amplifier 12 (refer to FIG. 3). A delay time is determined by changing each of the capacitances of the capacitors C lying within the capacitor banks CA of the A group circuit 142 and the capacitor banks CB of the B group circuit 144. FIG. 10 is a diagram showing the relationship between the capacitance of each capacitor C and one cycle CY. FIG. 11 is a table showing a state of the on/off switches relative to the capacitors C1 through C4 when the output current is phase-shifted every 22.5° between 0° and 360°.

As capacitance ratios for the respective capacitors, the capacitor C1 is set to 0.08, the capacitor C2 is set to 0.22, the capacitor C3 is set to 0.32, and the capacitor C4 is set to 0.38, respectively. Summing the capacitance ratios for the capacitors C1 through C4 results in 1. This corresponds to the fact that as is understood by looking at the cycle of the A group circuit 142 shown in the upper left drawing of FIG. 10, the capacitance ratio for the capacitor C1 is set to "1−cos (22.5°), the capacitance ratio for the capacitor C2 is set to "cos (22.5°)−cos(45°), the capacitance ratio for the capacitor C3 is set to "cos(45°)−cos(67.5°), and the capacitance ratio for the capacitor C4 is set to "cos(67.5°).

As illustrated in the A group circuit 142 shown in the upper left drawing of FIG. 10, the capacitors C1 through C4 lying within the capacitor bank CA are turned on/off by their corresponding on/off switches CS to thereby make it possible to phase-shift an output current to 0° (360°), 22.5°(337.5°), 45° (315°) and 67.5° (292.5°). Switching between the positive and negative polarities of the A group circuit 142 makes it possible to phase-shift an output current to 112.5° (247.5°), 135° (225°), 157.5° (202.5°) and 180° as shown in the upper right drawing of FIG. 10. The switching between the positive and negative polarities of the A group circuit 142 is performed by the changeover switch SWA (refer to FIG. 3).

As illustrated in the B group circuit 144 shown in the lower left drawing of FIG. 10, the capacitors C1 through C4 lying within the capacitor bank CB are turned on/off by their corresponding on/off switches CS to thereby make it possible to phase-shift an output current to 22.5°(157.5°), 45°(135°), 67.5°(112.5° and 90°. Switching between the positive and negative polarities of the B group circuit 144 makes it possible to phase-shift an output current to 202.5°(337.5°), 225° (315°), 247.5° (292.5°) and 270° as shown in the lower right drawing of FIG. 10. The switching between the positive and negative polarities of the B group circuit 144 is performed by the changeover switch SWB (refer to FIG. 3).

In summary, as shown in FIG. 11, the output current can be phase-shifted every 22.5° between 0° and 360° by turning on/off of the capacitors C1 through C4 and switching between the positive and negative polarities of the A group circuit 142 and the B group circuit 144. Incidentally, although the A group circuit 142 and the B group circuit 144 are identical in circuit configuration, the B group circuit 144 is 90° out of phase with the B group circuit 144. This is because as shown in FIG. 5 in particular, the A group circuit 142 and the B group circuit 144 write the output current into the capacitors C with the same timing, whereas the timing provided to read the output current of each capacitor C from the A group circuit 144 lags by 90° in phase behind the timing provided to read the output current of each capacitor C from the A group circuit 144.

Control on the delay time (phase-shift) will be explained in detail using FIGS. 9 and 12.

FIGS. 9 and 12 show the capacitor bank CA1 and the capacitor bank CA2 at the time T1 (CY/4). The output current amplified by the amplifier 12 (refer to FIG. 3) is written into the capacitor bank CA2 or the capacitors C1 through C4. On the other hand, the electric charge stored in each of the capacitors C1 through C4 is read into the differential amplifying unit 16 (refer to FIG. 3) from the capacitor bank CA1.

At the capacitor bank CA1 shown in FIG. 9, the on/off switches CS1a (CS1b) through CS4a (CS4b) are respectively connected to all capacitors C1 through C4. That is, there is shown in FIG. 11, a case where the delay unit 14 sets the phase shift of the output current to 0°.

In contrast to this, at the capacitor bank CA1 shown in FIG. 12, the on/off switch CS3a (CS3b) is connected to its corresponding capacitor C3, and the on/off switch CS4a (CS4b) is connected to its corresponding capacitor C4. That is, there is shown in FIG. 11, a case where the delay unit 14 sets the phase shift of the output current to 45°.

Thus, the delay unit 14 employed in the first embodiment sets the delay time (phase shift) of the output current by performing switching of reading between the electric charges stored in the capacitors C1 through C4.

Second Embodiment

In the first embodiment, as shown in FIGS. 8 and 9, when the output power is written into each capacitor C, it has been written into all of the capacitors C1 through C4 of each capacitor bank CA. In a second embodiment, an output current is written only into a predetermined capacitor depending on a delay time.

Figure 13:
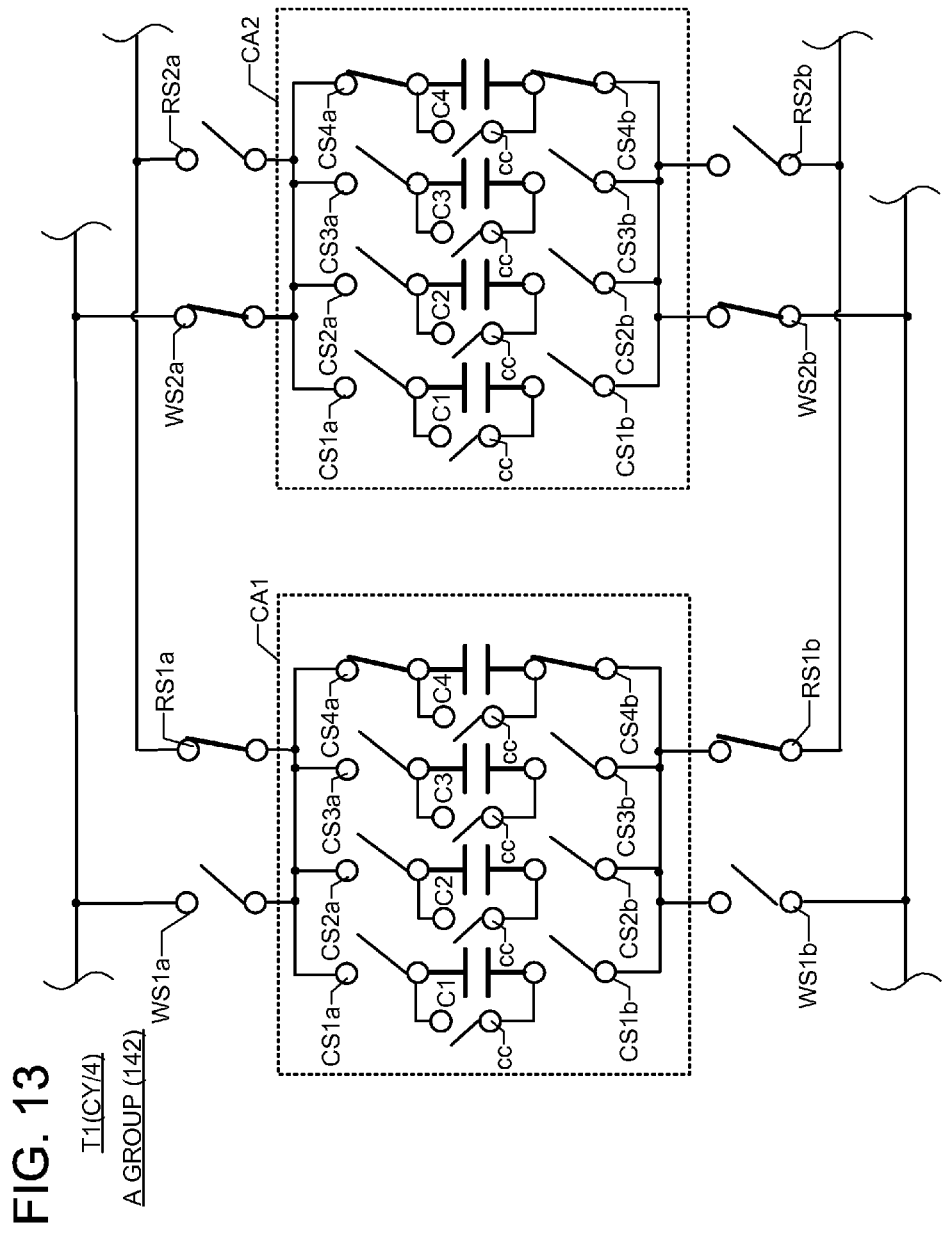
FIG. 13 is a diagram showing a state of the on/off switches CS of the capacitor banks CA1 and CA2 at the time T1.

FIG. 13 is a diagram showing the capacitor banks CA1 and CA2 at the time T1 (CY/4). The delay unit 14 sets the delay time to 67.5°. In FIG. 13, the on/off switches CS4a and CS4b of the capacitor banks CA1 and CA2 are connected to their corresponding capacitors C4. An output current amplified by the amplifier 12 is written only into the capacitor C4 of the capacitor bank CA2. On the other hand, the electric charge stored only in the capacitor C4 is read into the differential amplifying unit 16 (refer FIG. 3) from the capacitor bank CA1.

Thus, in the second embodiment, the output current is written only into the predetermined capacitor C according to the delay time. Since the output current is written only into the capacitor C necessary for the delay time, a reduction in current consumption can be achieved.

Third Embodiment

In the first embodiment, as shown in FIG. 5, the output current has been read with the capacitor banks CB1 through CB4 of the B group circuit 144 being 90° out of phase with the capacitor banks CA1 through CA4 of the A group circuit 142. In a third embodiment, a 90° phase shifter is placed in a read line of the B group circuit 144.

Figure 14:
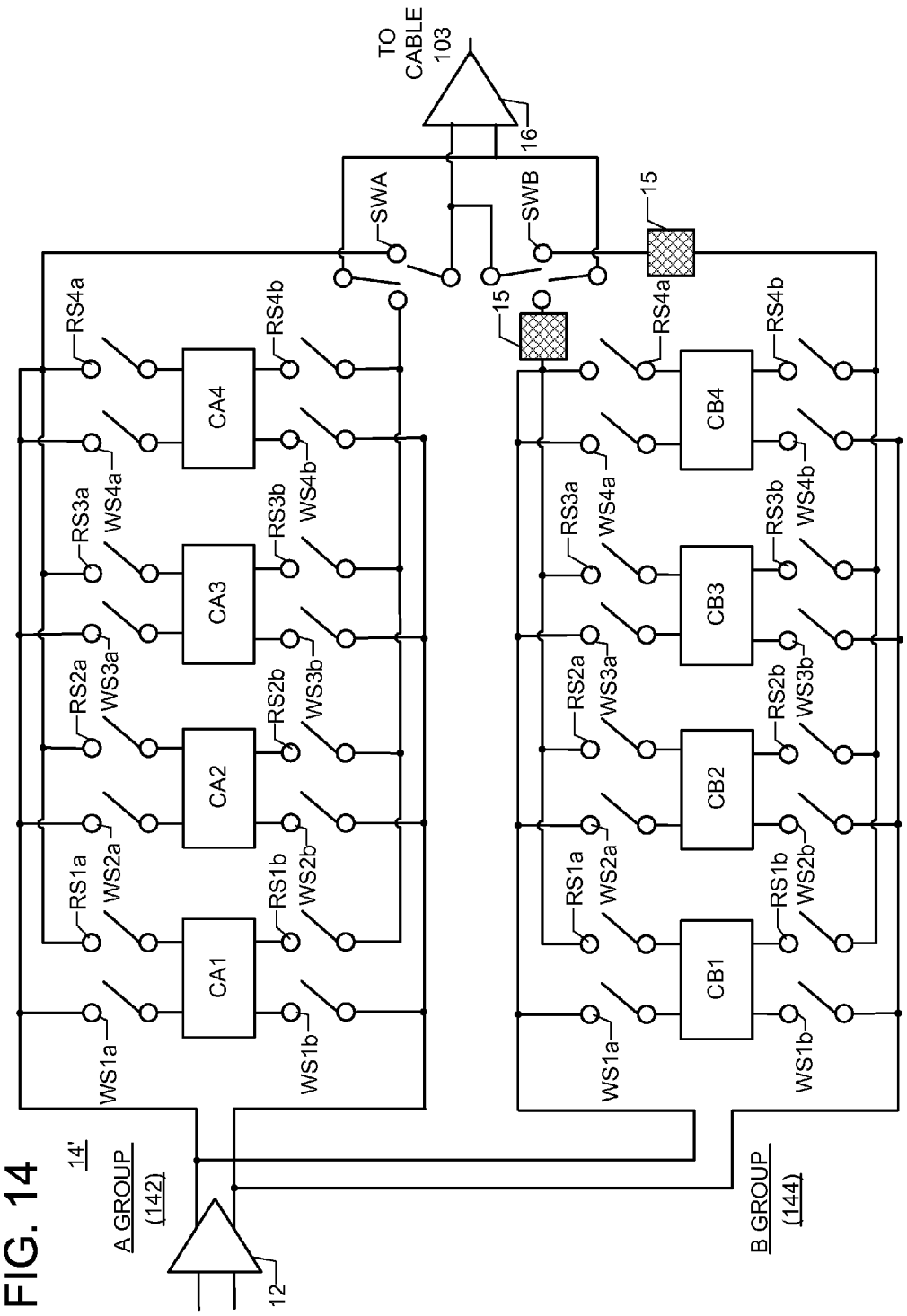
FIG. 14 is a diagram showing a configuration of a delay unit lying within a reception circuit according to a third embodiment.

FIG. 14 is a diagram showing a configuration of a delay unit 14' in a reception circuit 10 according to the third embodiment. The delay unit 14' of the third embodiment is substantially identical in configuration to the delay unit 14 of the first embodiment shown in FIG. 3. The 90° phase shifter 15 is however placed in the read line of the B group circuit 144. Therefore, in the third embodiment, there is no need to make equal the timings to write the output current into the capacitors C lying within the capacitor banks CA and CB and shift the timing provided to read the output current from the capacitor C by 90° in phase as in the first embodiment. That is, the delay unit 14' of the third embodiment makes it possible to synchronize the timing provided to write an output current into each of capacitors C lying within capacitor banks CA and CB with the timing provided to read the output current from the capacitor C.

Fourth Embodiment

In the first through third embodiments, as shown in FIG. 3, the A group circuit 142 has been provided with the four capacitor banks CA through CA4, and the B group circuit 144 has been provided with the four capacitor banks CB1 through CB4. Since the A group circuit 142 and the B group circuit 144 have the four capacitor banks respectively, the delay unit 14 has performed the writing and reading of the output current with one cycle CY divided into the four equal parts. In a fourth embodiment, the A group circuit 142 and the B group circuit 144 have eight capacitor banks respectively (not shown).

In FIG. 15, the write is represented as "W", the read is represented as "R" and the charge's clear is represented as "C", respectively. In FIG. 15 as well, one cycle CY ranges from a time T0 (0) to a time T8 (8CY/8), and one cycle CY is shown with divided into eight equal parts. The timings provided to write an output current, read the same and clear an electric charge are the same as at the times T0 (0) and T8 (8CY/8). The writing of the output current, the reading thereof and the clearing of the electric charge are subsequently continued at times T9 (9CY/8), T10 (10CY/8) etc.

At the time T1 (CY/8), for example, the capacitor bank CA1 of the A group circuit 142 is represented as read (R), the capacitor bank CA2 thereof is represented as write (W), and the capacitor bank CA3 thereof is represented as charge's clear (C), respectively. The capacitor bank CB2 of the B group circuit 144 is represented as write (W), the capacitor bank CB3 thereof is represented as charge's clear (C), and the capacitor bank CB7 thereof is represented as read (R), respectively.

Even where the A group circuit 142 and the B group circuit 144 have the eight capacitor banks respectively, the timing provided to write into each capacitor bank of the A group circuit 142, and the timing provided to read from each capacitor bank of the B group circuit 144 are performed simultaneously. The timing provided to read from each capacitor bank of the A group circuit 142, and the timing provided to read from each capacitor bank of the B group circuit 144 are out of phase with each other by 90°. When the A group circuit 142 and the B group circuit 144 have the eight capacitor banks respectively, the number of times (number of samplings) that the output current is written increases. The delay unit 14 is therefore capable of controlling a delay time with satisfactory accuracy.

Fifth Embodiment

In the first through fourth embodiments, as shown in FIG. 9 and the like, the four capacitors C1 through C4 different in capacity have been provided within one capacitor bank CA or CB. In a fifth embodiment, three capacitors C1 through C3 different in capacity are provided within one capacitor bank CA or CB.

Figure 16:
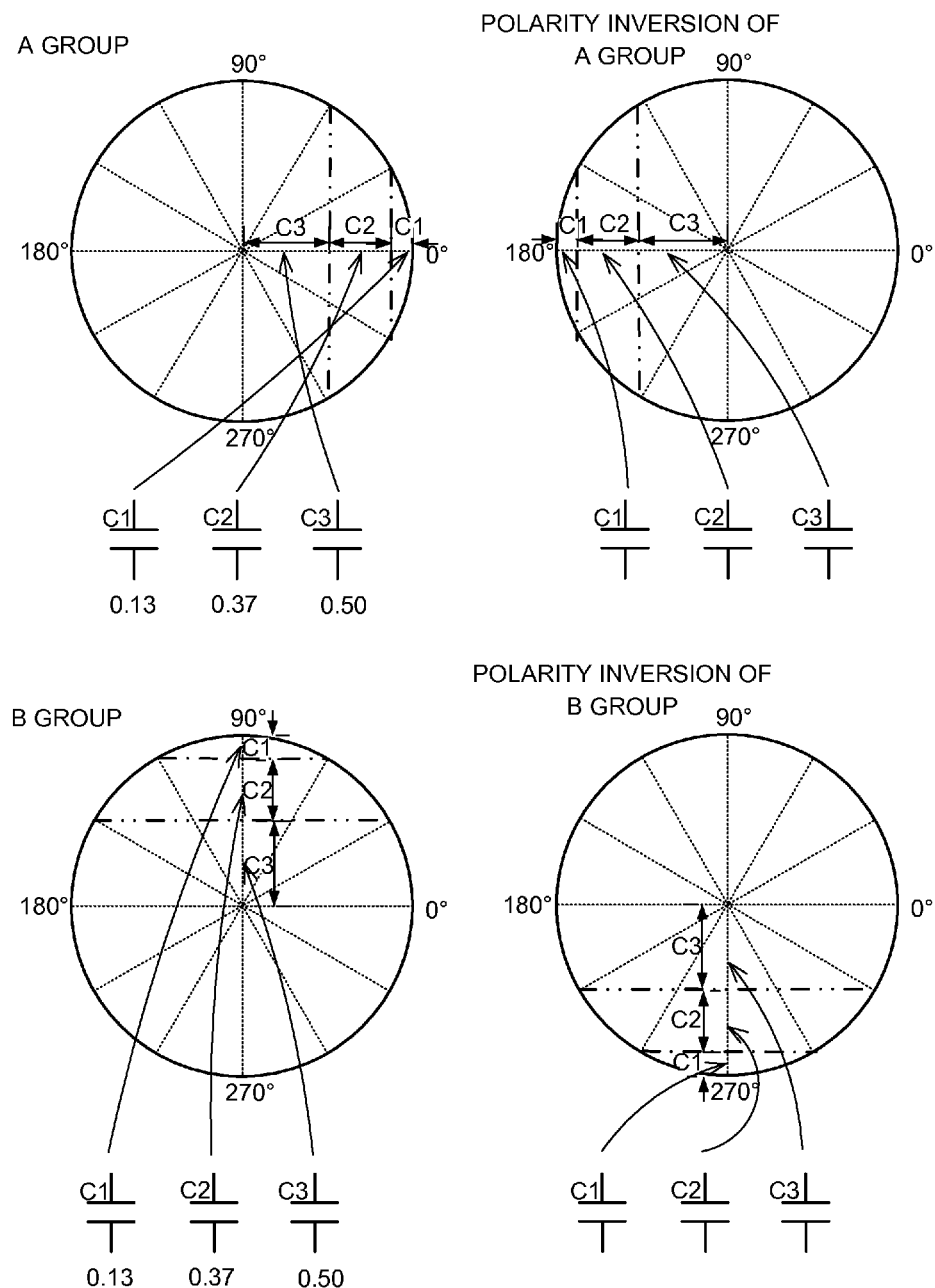
FIG. 16 is a diagram showing the relationship between the capacitances of three capacitors C and one cycle CY.

FIG. 16 is a diagram showing the relationship between the capacitances of three capacitors C and one cycle CY.

As capacitance ratios for the respective capacitors, the capacitor C1 is set to 0.13, the capacitor C2 is set to 0.37, and the capacitor C3 is set to 0.5, respectively. Summing the capacitance ratios for the capacitors C1 through C4 results in 1. This corresponds to the fact that as is understood by looking at the cycle of the A group circuit 142 shown in the upper left drawing of FIG. 16, the capacitance ratio for the capacitor C1 is set to "1−cos(30°), the capacitance ratio for the capacitor C2 is set to "cos(30°)−cos(60°), and the capacitance ratio for the capacitor C3 is set to "cos(60°)".

As illustrated in the A group circuit 142 shown in the upper left drawing of FIG. 16, the capacitors C1 through C3 lying within the capacitor bank CA are turned on/off by their corresponding on/off switches CS to thereby make it possible to phase-shift an output current to 0°(360°), 30°(330°) and 60° (300°). Switching between the positive and negative polarities of the A group circuit 142 makes it possible to phase-shift an output current to 120°(240°), 150°(210°) and 180° as shown in the upper right drawing of FIG. 16. The switching between the positive and negative polarities of the A group circuit 142 is performed by the changeover switch SWA (refer to FIG. 3).

As illustrated in the B group circuit 144 shown in the lower left drawing of FIG. 16, the capacitors C1 through C3 lying within the capacitor bank CB are turned on/off by their corresponding on/off switches CS to thereby make it possible to phase-shift an output current to 30°(150°), 60°(120°) and 90°. Switching between the positive and negative polarities of the B group circuit 144 makes it possible to phase-shift an output current to 210°(330°), 240°(300°) and 270° as shown in the lower right drawing of FIG. 16. The switching between the positive and negative polarities of the B group circuit 144 is performed by the changeover switch SWB (refer to FIG. 3).

Although not shown in the drawing, two capacitors C1 and C2 different in capacitance may be provided within one capacitor bank CA or CB. Alternatively, five capacitors C1 through C5 different in capacitance may be provided within one capacitor bank CA or CB. If the two capacitors C1 and C2 different in capacitance are provided therewithin, their capacitance ratios become 0.29 (1−cos)) (45° for the capacitor C1 and 0.71 (cos(45°)) for the capacitor C2. If the five capacitors C1 through C5 different in capacitance are provided therewithin, their capacitance ratios become 0.05 (1−cos(18°)) for the capacitor C1, 0.14 (cos(18°)−cos(36°)) for the capacitor C2, 0.22 (cos(36°)−cos(54°)) for the capacitor C3, 0.28 (cos(54°)−cos(72°)) for the capacitor C4, and 0.31 (cos(72°)) for the capacitor C5.

In the first through fifth embodiments, the delay unit 14 has been configured to be capable of setting the delay time of one cycle (360°), but may be configured to be able to set a delay time of a half cycle (0° to 180° or 90°-phase to 270°). If the delay time of the half cycle is taken, the changeover switch SWA or SWB (refer to FIGS. 3 and 14) may be omitted.

Sixth Embodiment

The first through fifth embodiments respectively have described the case where the delay unit 14 in the reception circuit 10 is constant in switching clock frequency for the write and read switches WS and RS. A sixth embodiment will explain an example in which a delay unit 14" has a switch controller 16 which varies a switching clock frequency. In particular, the sixth embodiment will be explained as compared with the FIG. 3 explained in the first embodiment, but can be applied also to the second through fifth embodiments.

As the position in a subject gets deeper, attenuation becomes large unless transmission is performed at a frequency low in center frequency, and an echo signal reflected by a deep portion is not returned to the ultrasound probe 102. Therefore, in the exemplary embodiment, the frequency low in center frequency as the deep portion is reached is transmitted. In the first through fifth embodiments, the center frequency has not been taken into consideration with respect to the depth of the subject, and the delay time (phase shift) of the output current has been set in the steady state of the center frequency.

In the sixth embodiment, the delay unit 14" performs time-frequency control (TFC) indicative of a correction corresponding to the depth of an echo reflection point. When the center frequency is changed by the time-frequency control, focusing good for a B-mode display is enabled.

FIG. 17 is a diagram illustrating a configuration of the delay unit 14" lying within the reception circuit 10. The delay unit 14" shown in FIG. 17 is different from the delay unit 14 shown in FIG. 3 in that the switch controller 16 is provided. The switch controller 16 receives a constant clock frequency therein and outputs the varied clock frequency to write and read switches WS and RS. Described specifically, the switch controller 16 outputs a varied frequency to the write switches WS (WS1a through WS4a and WS1b through WS4b) and the read switches RS (RS1a through RS4a and RS1b through RS4b) of the A group circuit 142 and the B group circuit 144.

Figure 18A:
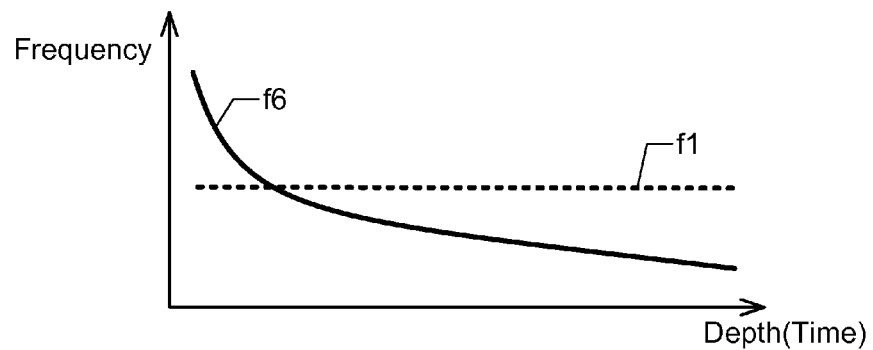
FIGS. 18A-C are graphs showing the relationship between the depth of a subject and a center frequency, a phase, and a switching clock frequency, respectively.
Figure 18B:
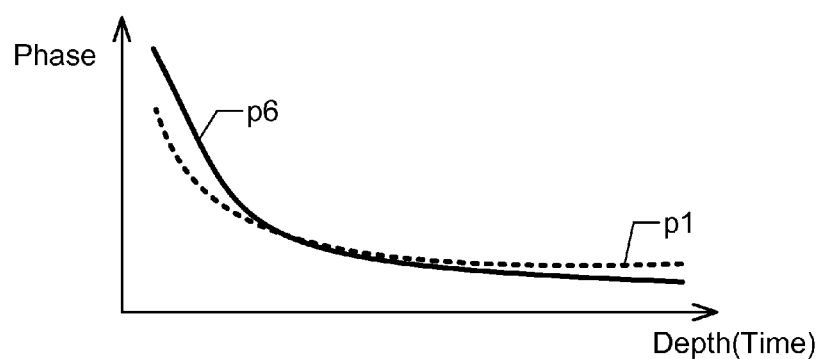
Figure 18C:
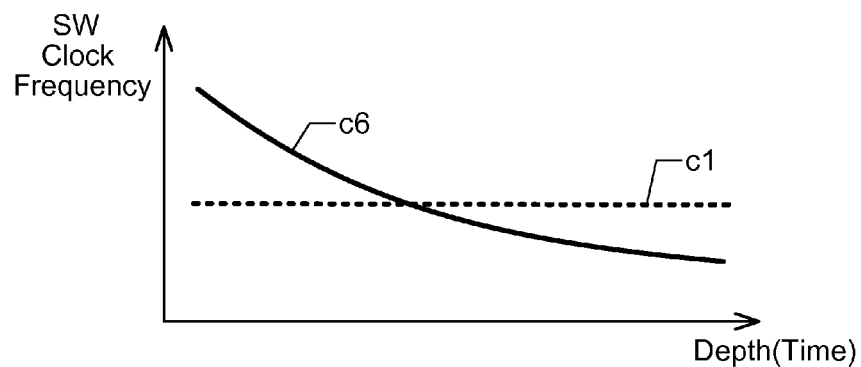

FIG. 18A is a graph showing the relationship between a center frequency and the depth of a subject. FIG. 18B is a graph showing the relationship between the phase and the depth of the subject. FIG. 18C is a graph showing the relationship between a clock frequency of a switch and the depth of the subject. Here, the horizontal axis is the time taken when an echo signal is returned, since the deeper the echo reflection point of the subject, the longer the time of return of the echo signal. That is, 18A is a graph indicative of the time-frequency control.

A graph f1 of FIG. 18A is a center frequency employed in the first through fifth embodiments. The center frequency is constant even at the shallow and deep portions of the subject.

Then, a graph f6 is a graph in which the deeper the echo reflection point of the subject, the lower the center frequency. In the sixth embodiment, to perform such time-frequency control, the switching clock frequencies of the write switches WS (WS1a through WS4a and WS1b through WS4b) and the read switches RS (RS1a through RS4a and RS1b through RS4b) of the A group circuit 142 and the B group circuit 144 are changed depending on the echo reflection point of the subject. That is, they are evenly assigned to the times T0, T1 (CY/4), T2 (2CY/4), T3 (3CY/4) and T4 (4CY/4) in FIG. 5, but the times T are made variable.

A graph c1 of FIG. 18C corresponds to the times T0 (0), T1 (CY/4), and the like shown in FIG. 5. The switching clock frequency is constant regardless of the echo reflection point of the subject. A graph c6 indicates that the deeper the echo reflection point of the subject, the lower the switching clock frequency whereas the shallower the echo reflection point of the subject, the higher the switching clock frequency.

When the switching clock frequency changes as shown in the graph c6, the phase also changes as illustrated in FIG. 18B. A graph p1 of FIG. 18B shows the phase from the first through fifth embodiments, whereas a graph p6 thereof shows the phase in the sixth embodiment. Significantly changing the phase between the shallow and deep positions of the echo reflection point of the subject as shown in the graph p6 makes it possible to vary the center frequency as shown in the graph f6 of FIG. 18A. Thus, the switch controller 16 is capable of controlling a delay in reception for dynamic focus.

While exemplary embodiments have been explained in detail above, the invention can be carried out by making various changes and modifications to the exemplary embodiments within the technical scope thereof as is apparent to those skilled in the art.

Many widely different embodiments may be configured without departing from the spirit and the scope of the present invention. It should be understood that the present invention is not limited to the specific embodiments described in the specification, except as defined in the appended claims.

What is claimed is:

1. A reception circuit disposed within an ultrasound probe, said reception circuit comprising:
   at least one amplifying unit configured to amplify echo signals received by ultrasound transducers; and
   at least one delay unit connected to the amplifying unit and comprising a first circuit and a second circuit each configured to apply a delay time to an output from the amplifying unit, wherein the first and second circuits each have a plurality of capacitor banks, wherein each capacitor bank comprises:
      two or more capacitors each configured to write therein a signal amplified by the amplifying unit, wherein the two or more capacitors are different from one another in capacitance;
      write switches configured to write an output current into the first and second capacitors of the two or more capacitors; and
      read switches configured to read the output written into the first and second capacitors.

2. A reception circuit according to claim 1, wherein a timing provided to read the output current from each of the capacitors of the first circuit, and a timing provided to read the output current from each of the capacitors of the second circuit are made different in phase from each other by 90° using the read switches.

3. A reception circuit according to claim 1, wherein the capacitor banks of the first circuit and the capacitor banks of the second circuit are made identical in write timing using the write switches.

4. A reception circuit according to claim 2, wherein the capacitor banks of the first circuit and the capacitor banks of the second circuit are made identical in write timing using the write switches.

5. A reception circuit according to claim 1, wherein the output is configured to be written into all the capacitors of the first and second circuits by the write switches, and
   wherein the output current or electric charge is configured to be read from a predetermined capacitor of the capacitors according to the delay time by the read switches.

6. A reception circuit according to claim 2, wherein the output is configured to be written into all the capacitors of the first and second circuits by the write switches, and
   wherein the output current or electric charge is configured to be read from a predetermined capacitor of the capacitors according to the delay time by the read switches.

7. A reception circuit according to claim 3, wherein the output is configured to be written into all the capacitors of the first and second circuits by the write switches, and
   wherein the output current or electric charge is configured to be read from a predetermined capacitor of the capacitors according to the delay time by the read switches.

8. A reception circuit according to claim 1, wherein the voltage of the output is configured to be written into predetermined said capacitors of the first and second circuits by the write switches, and
   wherein the output current or electric charge is configured to be read from at least said predetermined capacitors according to the delay time by the read switches.

9. A reception circuit according to claim 2, wherein the voltage of the output is configured to be written into predetermined said capacitors of the first and second circuits by the write switches, and
   wherein the output current or electric charge is configured to be read from at least said predetermined capacitors according to the delay time by the read switches.

10. A reception circuit according to claim 3, wherein the voltage of the output is configured to be written into predetermined said capacitors of the first and second circuits by the write switches, and
    wherein the output current or electric charge is configured to be read from at least said predetermined capacitors according to the delay time by the read switches.

11. A reception circuit according to claim 1, wherein the capacitor banks of the first circuit differ in phase in increments of 90°/n where n is a natural number, and the output current is configured to be written therein by the write switches.

12. A reception circuit according to claim 1, wherein capacitance ratios for the two or more capacitors are set in such a manner that the delay time is evenly divided.

13. A reception circuit according to claim 1, wherein the delay unit is provided for each of a plurality of channels of the ultrasound transducers.

14. A reception circuit according to claim 1, wherein the total capacitance of the capacitors is smaller than the capacitance of a cable which connects the ultrasound probe to an apparatus main body of an ultrasound image display apparatus.

15. A reception circuit according to claim 1, wherein the output current or electric charge of the at least one delay unit is added at an output line that extends from the delay unit on a subsequent stage side of the read switches.

16. A reception circuit according to claim 1, wherein the amplifying unit is a current output type amplifier configured to amplify an input signal, convert the amplified signal into a current signal, and output the converted signal from the current output type amplifier.

17. A reception circuit according to claim 1, further comprising a switch controller configured to vary a switching clock frequency of each of the read and write switches.

18. A reception circuit according to claim 17, wherein the switching clock frequency decreases as an echo reflection point of a subject deepens.

19. An ultrasound probe comprising:
    a reception circuit comprising:
        at least one amplifying unit configured to amplify echo signals received by ultrasound transducers; and
        at least one delay unit connected to the amplifying unit and comprising a first circuit and a second circuit each configured to apply a delay time to an output from the amplifying unit, wherein the first and second circuits each have a plurality of capacitor banks, wherein each capacitor bank comprises:
            two or more capacitors each configured to write therein a signal amplified by the amplifying unit, wherein the two or more capacitors are different from one another in capacitance;
            write switches configured to write an output current into the first and second capacitors of the two or more capacitors; and
            read switches configured to read the output written into the first and second capacitors.

20. An ultrasound image display apparatus equipped with an ultrasound probe, the ultrasound probe comprising:
    a reception circuit comprising:
        at least one amplifying unit configured to amplify echo signals received by ultrasound transducers; and
        at least one delay unit connected to the amplifying unit and comprising a first circuit and a second circuit each configured to apply a delay time to an output from the amplifying unit, wherein the first and second circuits each have a plurality of capacitor banks, wherein each capacitor bank comprises:
            two or more capacitors each configured to write therein a signal amplified by the amplifying unit, wherein the two or more capacitors are different from one another in capacitance;
            write switches configured to write an output current into the first and second capacitors of the two or more capacitors; and
            read switches configured to read the output written into the first and second capacitors.

\* \* \* \* \*